United States Patent
Sandstrom

(10) Patent No.: US 7,506,677 B2
(45) Date of Patent: Mar. 24, 2009

(54) PNEUMATIC TIRE HAVING AN INNERLINER COMPRISED OF BUTYL RUBBER AND DISPERISON OF PRE-CURED DIENE-BASED RUBBER

(75) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 330 days.

(21) Appl. No.: 10/879,614

(22) Filed: Jun. 28, 2004

(65) Prior Publication Data

US 2005/0284556 A1 Dec. 29, 2005

(51) Int. Cl.
*B60C 5/14* (2006.01)

(52) U.S. Cl. .................. 152/510; 152/DIG. 16

(58) Field of Classification Search .......... 152/510, 152/DIG. 16
See application file for complete search history.

(56) References Cited

U.S. PATENT DOCUMENTS

| | | | | |
|---|---|---|---|---|
| 2,906,313 A | * | 9/1959 | Ford ............ | 152/450 |
| 3,586,087 A | * | 6/1971 | Messerly et al. ............ | 152/510 |
| 4,725,649 A | * | 2/1988 | Hoshino ............ | 525/133 |
| 5,922,153 A | * | 7/1999 | Beers et al. ............ | 152/510 |
| 6,077,874 A | | 6/2000 | Wideman et al. ............ | 521/42.5 |
| 6,265,454 B1 | * | 7/2001 | McNutt et al. ............ | 521/41 |
| 2003/0004260 A1 | | 1/2003 | Squire et al. ............ | 524/500 |
| 2004/0016493 A1 | | 1/2004 | Sandstrom et al. ............ | 152/450 |

FOREIGN PATENT DOCUMENTS

| | | |
|---|---|---|
| EP | 395571 | 10/1990 |
| EP | 682075 | 11/1995 |
| JP | 2003-313365 A * | 11/2003 |

OTHER PUBLICATIONS

Klingensmith et al., Article entitled "Rubber Compounding," Kirk-Othmer Encyclopedia of Chemical Technlogy, sections 1 to 2.8, 1997 (online posting date Dec. 4, 2000).*
European Search Report.

* cited by examiner

*Primary Examiner*—Geoffrey L Knable
(74) *Attorney, Agent, or Firm*—Henry C. Young, Jr.

(57) ABSTRACT

The present invention relates to a pneumatic rubber tire having an integral innerliner of a sulfur cured rubber composition. The innerliner rubber composition is comprised of at least one elastomer selected from bromobutyl rubber and chlorobutyl rubber which also contains a dispersion therein of pre-cured diene-based rubber particles.

2 Claims, No Drawings

PNEUMATIC TIRE HAVING AN INNERLINER COMPRISED OF BUTYL RUBBER AND DISPERISON OF PRE-CURED DIENE-BASED RUBBER

FIELD OF THE INVENTION

The present invention relates to a pneumatic rubber tire having an integral innerliner of a sulfur cured rubber composition. The innerliner rubber composition is comprised of at least one elastomer selected from bromobutyl rubber and chlorobutyl rubber which also contains a dispersion therein of pre-cured diene-based rubber particles.

BACKGROUND OF THE INVENTION

The inner surface of a pneumatic tire is typically comprised of an elastomeric composition designed to prevent or retard the permeation of air and moisture into the carcass from the tire's inner air chamber. It is often referred to as an innerliner. Rubbers, such as halobutyl and blends of butyl and halobutyl rubber, which are relatively impermeable to air are often used as a major proportion of the innerliners.

Accordingly, the air and moisture permeability resistance of the innerliner rubber composition is an important consideration.

The innerliner is normally prepared by conventional calendering or milling techniques to form a strip of uncured compounded rubber of appropriate width which is sometimes referred to as a gum strip. Typically, the gum strip is the first element of the tire applied to a tire building drum, over and around which the remainder of the tire is built. When the tire is cured, the innerliner becomes an integral, co-cured, part of the tire. Tire innerliners and their methods of preparation are well known to those having skill in such art.

There remains an ongoing desire to provide enhanced or suitable variations of butyl rubber-based tire innerliners without significantly affecting the air and moisture permeability resistance of the innerliner rubber composition.

Halobutyl and butyl rubbers are usually one of the most expensive elastomers used in a tire. Given the competitive tire market and the continued need to lower the cost of manufacturing tires, there exists a desire to decrease the cost of innerliners which perform such an important function in the performance of a tire.

In the description of the invention, the term "phr" relates to parts by weight of a particular ingredient per 100 parts by weight of rubber contained in a rubber composition. The terms "rubber" and "elastomer" are used interchangeably unless otherwise indicated, the terms "cure" and vulcanize" may be used interchangeably unless otherwise indicated and the terms "rubber composition" and "rubber compound" may be used interchangeably unless otherwise indicated. The term "butyl type rubber" is used herein to refer to butyl rubber (copolymer of isobutylene with a minor amount comprised of, for example about 1 to about 3 percent, of units derived from isoprene), and halobutyl rubber as chlorobutyl rubber and bromobutyl rubber (chlorinated and brominated butyl rubber, respectively) unless otherwise indicated.

SUMMARY AND PRACTICE OF THE INVENTION

The present invention relates to a pneumatic rubber tire having an integral innerliner of a sulfur cured rubber composition. The innerliner is of a rubber composition comprised of, based upon parts by weight per 100 parts by weight of total rubber (phr), (A) 100 phr of elastomers comprised of:
  (1) a butyl type rubber (not a partially depolymerized butyl type rubber) as:
    (a) about 60 to 100, alternately about 80 to about 95, alternately about 60 to about 90 and alternately from about 60 to about 85, phr of halobutyl rubber selected from at least one of bromobutyl rubber and chlorobutyl rubber (halogenated butyl rubber) and their mixtures, and
    (b) zero to about 30, alternately from about 5 to about 20, phr of butyl rubber (non-halogenated butyl rubber);
  (2) zero to about 20, alternately from about 5 to about 15, phr of at least one diene-based elastomer selected from polymers of at least one of isoprene and 1,3-butadiene and copolymers of styrene and at least one of isoprene and 1,3-butadiene and their mixtures; preferably selected from styrene/butadiene copolymer, natural rubber and mixtures thereof, and
  (3) zero to about 30, alternately from about 5 to about 20, phr of at least one partially depolymerized bromobutyl rubber, chlorobutyl rubber, butyl rubber and their mixtures, and
(B) from 2 to about 40, alternately about 10 to about 40, phr of particulate pre-cured rubber filler comprised of:
  (1) from 2 to about 40, alternately about 5 to about 20, phr of particles of sulfur pre-cured diene-based rubber composition comprised of at least one elastomer selected from polymers of at least one of isoprene and 1,3-butadiene and copolymers of styrene and at least one of isoprene and 1,3-butadiene and their mixtures, wherein at least 90 percent of said sulfur pre-cured rubber particles have an average diameter in a range of from about 50 to about 500, alternately from about 70 to about 300, microns;
  (2) from zero to about 30, alternately about 5 to about 20, phr of particles of pre-cured butyl type rubber composition comprised of at least one elastomer selected from bromobutyl rubber, chlorobutyl rubber, butyl rubber and their mixtures, wherein at least 90 percent of said pre-cured rubber particles have an average diameter in a range of from about 50 to about 500, alternately from about 70 to about 300, microns;
(C) about 30 to about 110, alternately about 40 to about 90, phr of reinforcing filler comprised of:
  (1) about 30 to about 110 phr of rubber reinforcing carbon black, or
  (2) about 5 to about 70 phr of rubber reinforcing carbon black and from about 25 to about 70 phr of synthetic amorphous precipitated silica aggregates together with a coupling agent (for said precipitated silica aggregates) having a moiety reactive with hydroxyl groups (e.g. silanol groups) on said precipitated silica aggregates and another different moiety interactive with said diene-based elastomer(s).

It has been found unexpectedly that an inclusion in the tire innerliner rubber composition of a dispersion of fine (small diameter) pre-sulfur cured diene-based rubber particles was observed to provide improved low temperature performance (reduction in brittle point) without a significant loss of other important physical tire innerliner properties such as air permeability resistance and flex fatigue resistance.

Therefore, a significant aspect of the invention is the combination of providing a lower cost tire innerliner butyl type rubber (by the inclusion of the sulfur pre-cured diene rubber based fine particles), as well as an observed improved low temperature performance in a form of lower brittle point.

While, historically, ground pre-cured diene-based rubber particles have been used as dispersions in rubber composition for various tire components (for example, see U.S. Pat. No. 6,077,874), it is believed that the same addition of ground pre-cured diene-based rubber particles in sulfur-cured butyl type rubber based tire innerliners is novel and a departure from past practice.

In addition to the aforesaid elastomers and reinforcing fillers as carbon black and silica, for the tire innerliner, the innerliner rubber composition may also contain other conventional ingredients commonly used in rubber vulcanizates, for example, tackifier resins, processing aids, talc, clay, mica, antioxidants, antiozonants, stearic acid, activators, waxes and oils as may be desired. The said integral innerliner may contain, for example, at least one of talc, clay, mica and calcium carbonate, and their mixtures, in a range, for example, of about 2 to 25 phr depending upon various physical properties desired for the innerliner composition. Typical amounts of processing aids may, for example, range from about 1 to 15 phr. The presence and relative amounts of the above additives are not an aspect of the present invention.

The vulcanization of the compound for use as an innerliner is conducted in the presence of a sulfur vulcanizing agent. Examples of suitable sulfur vulcanizing agents include elemental sulfur (free sulfur) or sulfur donating vulcanizing agents, for example, an amine disulfide, polymeric disulfide or sulfur olefin adducts. Preferably, the sulfur vulcanizing agent is elemental sulfur. As known to those skilled in the art, sulfur vulcanizing agents are used in an amount ranging from about 0.2 to 5.0 phr with a range of from about 0.5 to 3.0 being preferred.

Accelerators are used to control the time and/or temperature required for vulcanization and to improve the properties of the vulcanizate. A single accelerator system may be used, i.e., primary accelerator in conventional amounts ranging from about 0.5 to 3.0 phr. In the alternative, combinations of 2 or more accelerators may be used which may consist of a primary accelerator which is generally used in the larger amount (0.3 to 3.0 phr), and a secondary accelerator which is generally used in smaller amounts (0.05 to 1.0 phr) in order to activate and to improve the properties of the vulcanizate. Combinations of these accelerators have been known to produce a synergistic effect on the final properties and are somewhat better than those produced by either accelerator alone. In addition, delayed action accelerators may be used which are not effected by normal processing temperatures but produce satisfactory cures at ordinary vulcanization temperatures. Suitable types of accelerators that may be used are amines, disulfides, guanidines, thioureas, thiazoles, thiurams, sulfenamides, dithiocarbamate and xanthates. Preferably, the primary accelerator is a disulfide or sulfenamide.

Various synthetic, amorphous silicas may be used for the tire innerliner composition, where it is desired that the innerliner composition contains a silica. Representative of such silicas are, for example and not intended to be limiting, precipitated silicas as, for example, HiSil 210™ and HiSil 243™ from PPG Industries, as well as various precipitated silicas from J.M. Huber Company, various precipitated silicas from Degussa Company and various precipitated silicas from Rhodia Company.

Various coupling agents may be used for the various synthetic, amorphous silicas, particularly the precipitated silicas, to couple the silica aggregates to various of the elastomers. Representative of such coupling agents are, for example and not intended to be limiting, bis(3-trialkoxysilylpropyl) polysulfides wherein at least two, and optionally all three, of its alkoxy groups are ethoxy groups and its polysulfidic bridge is comprised of an average of from about 2 to about 4, alternatively from about 2 to about 2.6 or an average of from about 3.4 to about 3.8 connecting sulfur atoms, and an alkoxyorganomercaptosilane which may optionally have its mercpto moiety blocked with a suitable blocking agent during the mixing thereof with the rubber composition, wherein said alkoxy group is preferably an ethoxy group.

In practice the innerliner rubber composition, or compound, is formed into a gum strip. As known to those skilled in the art, a gum strip is produced by a press or passing a rubber compound through a mill, calender, multi-head extruder or other suitable means. Preferably, the gum strip is produced by a calender because greater uniformity is believed to be provided. The uncured gum strip is then constructed as an inner surface (exposed inside surface) of an uncured rubber tire structure, also known as the carcass. The innerliner is then sulfur co-cured with the tire carcass during the tire curing operation under conditions of heat and pressure.

Vulcanization of the tire of the present invention is generally carried out, for example, at temperatures of between about 100° C. and 200° C. Preferably, the vulcanization is conducted at temperatures ranging from about 110° C. to 180° C. Any of the usual vulcanization processes may be used such as heating in a press or mold, heating with superheated steam or hot salt or in a salt bath. Preferably, the heating is accomplished in a press or mold in a method known to those skilled in the art of tire curing.

As a result of this vulcanization, the innerliner becomes an integral part of the tire by being co-cured therewith.

Therefore, in practice, the innerliner may, for example, be first constructed as an inner surface of an uncured rubber tire as an uncured compounded rubber gum strip and is then co-cured with the tire during a tire curing operation wherein the said rubber gum strip may have, for example, a thickness in the range of about 0.04 to about 1, alternately in a range of from about 0.05 to about 0.5, centimeters, depending somewhat the type, size and intended use of the tire.

The pneumatic tire with the integral innerliner may be constructed in the form of a passenger tire, truck tire, or other type of bias or radial pneumatic tire.

The following examples are presented in order to illustrate but not limit the present invention. The parts and percentages are by weight unless otherwise noted.

EXAMPLE I

Samples of sulfur cured butyl rubber-type rubber compounds were prepared and referred to herein as Samples 1 through 5. Sample 1 is a Control rubber sample.

The following Table 1 illustrates the respective rubber compositions.

The materials were mixed in a sequential two-step mixing process, namely a non-productive mixing step, followed by a productive mixing step in an internal rubber mixer, in which all of the ingredients, except for zinc oxide and accelerators, were mixed in the first, non-productive mixing step and the zinc oxide and accelerators were added in the subsequent productive mixing step in an internal rubber mixer. The rubber mixtures were dumped from the respective rubber mixer and cooled to below 40° C. between mixing steps. Such sequential procedural non-productive and productive rubber mixing steps are well known to those having skill in such art.

TABLE 1

| Samples | 1 | 2 | 3 | 4 | 5 |
|---|---|---|---|---|---|
| Non-Productive Mixing Step | | | | | |
| Bromobutyl rubber[1] | 100 | 100 | 100 | 100 | 100 |
| Carbon black[2] | 60 | 60 | 60 | 60 | 60 |
| Processing aids[3] | 17.5 | 17.5 | 17.5 | 17.5 | 17.5 |
| Magnesium oxide | 0.15 | 0.15 | 0.15 | 0.15 | 0.15 |
| Pre-cured diene rubber filler | 0 | 2.5 | 5 | 7.5 | 10 |
| Productive Mixing Step | | | | | |
| Zinc oxide | 1 | 1 | 1 | 1 | 1 |
| Accelerators[5] | 1.87 | 1.87 | 1.87 | 1.87 | 1.87 |

[1]Bromobutyl rubber as Bromobutyl 2222 ™ from the ExxonMobil Company
[2]N660 rubber reinforcing carbon black, an ASTM designation
[3]Blend of Flexon 641 ™ from the ExxonMobil Company, Struktol 40MS ™ from the Struktol Company and fatty acids, including stearic acid
[4]Micron 495 ™ from the Edge Rubber Company as a particulate, ground, fine sulfur pre-cured diene rubber composition filler containing wherein at least 90 percent of the particles have an average diameter of less than 420 microns
[5]Benzothiazyl disulfide and tetramethyl thiuram disulfide The following Table 2 reports physical data for various physical properties of the Samples. For cured rubber samples, the respective samples were cured for about 23 minutes to a temperature of about 170° C.

TABLE 2

| Samples | 1 | 2 | 3 | 4 | 5 |
|---|---|---|---|---|---|
| Pre-cured diene rubber particles | 0 | 2.5 | 5 | 7.5 | 10 |
| Rheometer, 170° C. (MDR)[1] | | | | | |
| Maximum torque (dNm) | 3.66 | 3.74 | 3.73 | 3.8 | 3.95 |
| Minimum torque (dNm) | 1.43 | 1.39 | 1.46 | 1.55 | 1.57 |
| Delta torque (dNm) | 2.23 | 2.35 | 2.27 | 2.25 | 2.38 |
| T90, minutes | 6.5 | 6.8 | 6.4 | 6.3 | 6.1 |
| Stress-strain (ATS)[2] | | | | | |
| Tensile strength (MPa) | 7.47 | 6.57 | 6.63 | 6.34 | 6.42 |
| Elongation at break (%) | 829 | 686 | 696 | 666 | 651 |
| 300% modulus (MPa) | 2.51 | 2.69 | 2.74 | 2.83 | 2.95 |
| Rebound (%) | | | | | |
| 23° C. | 12 | 12 | 13 | 13 | 13 |
| 100° C. | 40 | 41 | 42 | 43 | 43 |
| Hardness (Shore A)[3] | | | | | |
| 23° C. | 55 | 55 | 53 | 55 | 54 |
| 100° C. | 35 | 35 | 35 | 36 | 35 |
| Tear strength, 95° C. (N)[4] | 74 | 78 | 95 | 97 | 81 |
| Pierced groove flex (mm @ 240 minutes)[5] | 2.73 | 2.77 | 2.6 | 2.8 | 2.77 |
| Air permeability (cc/mil per 24 hours)[6] | 44 | 42 | 53 | 55 | 54 |
| RPA, 100° C., 1 Hz | | | | | |
| G' at 10% strain (kPa) | 428 | 434 | 430 | 438 | 445 |
| Tan delta at 10% strain | 0.31 | 0.30 | 0.29 | 0.29 | 0.28 |

[1]Data obtained according to Moving Die Rheometer instrument, model MDR-2000 by Alpha Technologies, used for determining cure characteristics of elastomeric materials, such as for example Torque, T90 etc.
[2]Data obtained according to Automated Testing System instrument by the Instron Corporation which incorporates six tests in one system. Such instrument may determine ultimate tensile, ultimate elongation, modulii, etc. Data reported in the Table is generated by running the ring tensile test station which is an Instron 4201 load frame.
[3]Shore A hardness according to ASTM D-1415
[4]Data obtained according to a peel strength adhesion (tear strength) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument.
[5]Air permeability was determined by ASTM D-143
[6]Pierced groove flex values were determined by continuous dynamic flexing and measuring the extent of crack growth and expressed in terms of millimeters (mm) at 240 minutes of flexing at 23° C.
[7]Data obtained according to Rubber Process Analyzer as RPA 2000 ™ instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, Apr. 26 and May 10, 1993

From Table 2 it is observed that up to 10 phr of the sulfur pre-cured fine diene rubber particles can be added to a 100 phr bromobutyl rubber innerliner composition without significant loss of any critical cured compound property.

This is considered herein to be significant because it allows for a reduction of cost of innerliner rubber composition (the cost of the pre-cured diene-based rubber composition particles being significantly lower than the cost of the butyl type rubber) without significant loss of physical properties in general and particularly air permeability resistance.

EXAMPLE II

Samples of sulfur cured butyl rubber-type rubber compounds were prepared and referred to herein as Samples 6 through 12. Sample 6 is a Control rubber sample.

The following Table 3 illustrates the respective rubber compositions.

The materials were mixed in the manner of Example I.

TABLE 3

| Samples | 6 | 7 | 8 | 9 | 10 | 11 | 12 |
|---|---|---|---|---|---|---|---|
| Non-Productive Mixing Step | | | | | | | |
| Bromobutyl rubber[1] | 100 | 100 | 100 | 100 | 80 | 80 | 80 |
| Carbon black[2] | 60 | 60 | 60 | 60 | 60 | 60 | 60 |
| Processing aids[3] | 17.5 | 17.5 | 17.5 | 17.5 | 17.5 | 17.5 | 17.5 |
| Magnesium oxide | 0.15 | 0.15 | 0.15 | 0.15 | 0.15 | 0.15 | 0.15 |
| Pre-cured diene rubber particles[4] | 0 | 5 | 10 | 15 | 0 | 10 | 0 |
| Recycle butyl rubber[5] | 0 | 0 | 0 | 0 | 37 | 37 | 37 |
| Pre-cured butyl rubber particles[6] | 0 | 0 | 0 | 0 | 0 | 0 | 10 |
| Productive Mixing Step | | | | | | | |
| Zinc oxide | 1 | 1 | 1 | 1 | 1 | 1 | 1 |
| Accelerators[7] | 1.87 | 1.87 | 1.87 | 1.87 | 1.87 | 1.87 | 1.87 |

[1] Bromobutyl rubber as Bromobutyl 2222 ™ from the ExxonMobil Company
[2] N660 rubber reinforcing carbon black, an ASTM designation
[3] Blend of Flexon 641 ™ from the ExxonMobil Company, Struktol 40MS ™ from the Struktol Company and fatty acids, including stearic acid
[4] Micron 495 ™ from the Edge Rubber Company as a particulate, ground, sulfur pre-cured diene-based rubber composition.
[5] Partially depolymerized butyl rubber composition (not fine particles) which contains about 54 weight percent partially depolymerized butyl rubber as Butyl Reclaim 337 ™ from the US Rubber company, wherein for Table 3, the reported 37 phr represents 20 phr of the recycled (partially depolymerized) butyl rubber
[6] Particulate pre-cured butyl rubber composition filler as ME 80/100 ™ from Midwest Elastomers as a fine grind used butyl rubber tire cure bladder composition which contains about 55 weight percent butyl rubber.
[7] Benzothiazyl disulfide and tetramethyl thiuram disulfide The following Table 4 reports physical data for various physical properties of the Samples. For cured rubber samples, the respective samples were cured for about 23 minutes to a temperature of about 170° C.

TABLE 4

| Samples | 6 | 7 | 8 | 9 | 10 | 11 | 12 |
|---|---|---|---|---|---|---|---|
| Pre-cured diene rubber particles | 0 | 5 | 10 | 15 | 0 | 10 | 0 |
| Reclaim butyl rubber | 0 | 0 | 0 | 0 | 20 | 20 | 20 |
| Pre-cured butyl rubber particles | 0 | 0 | 0 | 0 | 0 | 0 | 10 |
| Bromobutyl | 100 | 100 | 100 | 100 | 80 | 80 | 80 |
| Rheometer, 170° C. | | | | | | | |
| Maximum torque (dNm) | 3.2 | 3.45 | 3.28 | 3.29 | 2.59 | 2.79 | 2.6 |
| Minimum torque (dNm) | 1.35 | 1.39 | 1.35 | 1.37 | 1.24 | 1.35 | 1.31 |
| Delta torque (dNm) | 1.85 | 2.06 | 1.93 | 1.92 | 1.35 | 1.44 | 1.29 |
| T90, minutes | 6.5 | 6 | 5.9 | 5.5 | 7.3 | 6.7 | 7.4 |
| Stress-strain | | | | | | | |
| Tensile strength (MPa) | 6.96 | 6.55 | 6.16 | 5.66 | 6.07 | 5.21 | 5.66 |
| Elongation at break (%) | 763 | 665 | 651 | 615 | 766 | 635 | 707 |
| 300% modulus (MPa) | 2.62 | 2.95 | 2.8 | 2.7 | 2.2 | 2.4 | 2.2 |
| Rebound, % | | | | | | | |
| 23° C. | 12 | 12 | 13 | 14 | 12 | 13 | 13 |
| 100° C. | 41 | 42 | 43 | 43 | 38 | 38 | 38 |
| Hardness (Shore A) | | | | | | | |
| 23° C. | 55 | 56 | 53 | 51 | 55 | 52 | 53 |
| 100° C. | 36 | 37 | 35 | 34 | 33 | 32 | 33 |
| Tear strength, 95° C., N | 105 | 102 | 87 | 81 | 83 | 76 | 68 |
| Pierad groove flex, mm @ | | | | | | | |
| 240 minutes | 3.77 | 3.57 | 3.7 | 3.7 | 3.7 | 3.6 | 3.67 |
| Tack, N | 14.5 | 11.6 | 14.4 | 15.4 | 13 | 12.4 | 13.4 |
| Air permeability | 58 | 66 | 84 | 83 | 74 | 63 | 67 |
| Brittle point, ° C. | −39 | −40 | −44 | −45 | −38 | −45 | −40 |

From Table 4 it is observed that a low temperature property (reduced brittle point) of the tire innerliner composition is improved (reduced) by the addition of the pre-cured diene rubber based particles (filler) without significant loss of other significant cured innerliner properties such as, for example, air permeability resistance. This is considered herein to be significant because it is indicative of improved low temperature performance for the tire innerliner composition.

From Table 4 it also can be seen that the addition of the pre-cured diene rubber filler can be combined with the reclaimed butyl rubber (also lower in cost than the bromobutyl rubber) for an additional tire innerliner cost saving benefit. It is considered herein, therefore, that it is possible to provide a butyl type rubber tire innerliner composition which contains a combination of both the pre-cured diene rubber filler together with the pre-cured butyl rubber filler or a combination of these pre-cured fillers with reclaimed butyl rubber.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having an integral innerliner of a sulfur cured butyl type rubber composition which contains a brittle point reduction promoting dispersion of sulfur pre-cured diene-based rubber composition comprised of, based upon parts by weight per 100 parts by weight of total rubber (phr), (A) 100 phr of elastomers comprised of:
   (1) butyl type rubber as:
      (a) about 60 to about 90 phr of halobutyl rubber selected from at least one of bromobutyl rubber and chlorobutyl rubber and their mixtures, and
      (b) zero to about 30 phr of butyl rubber;
   (2) zero to about 20 phr of at least one diene-based elastomer selected from polymers of at least one of isoprene and 1,3-butadiene and copolymers of styrene and at least one of isoprene and 1,3-butadiene, and their mixtures, and
   (3) about 5 to about 20 phr of at least one partially depolymerized bromobutyl rubber, chlorobutyl rubber, butyl rubber and their mixtures, and
(B) from 2 to about 40 phr of particulate pre-cured rubber filler comprised of particles of sulfur pre-cured diene-based rubber composition comprised of at least one elastomer selected from polymers of at least one of isoprene and 1,3-butadiene and copolymers of styrene and at least one of isoprene and 1,3-butadiene and their mixtures, wherein at least 90 percent of said sulfur pre-cured rubber particles thereof have an average diameter in a range of from about 50 to about 500 microns; and
(C) about 30 to about 110 phr of reinforcing filler comprised of:
   (1) about 30 to about 110 phr of rubber reinforcing carbon black, or
   (2) about 5 to about 70 phr of rubber reinforcing carbon black and from about 25 to about 70 phr of synthetic amorphous precipitated silica aggregates together with a coupling agent having a moiety reactive with hydroxyl groups on said precipitated silica aggregates and another different moiety interactive with said diene-based elastomer(s).

2. The pneumatic rubber tire of claim 1 wherein said integral innerliner of sulfur cured butyl type rubber composition contains an air permeability maintenance dispersion of pre-cured rubber filler comprised of about 10 to about 20 phr of particles of said sulfur pre-cured diene-based rubber wherein at least 90 percent of said sulfur pre-cured rubber particles thereof have an average diameter in a range of from about 50 to about 500 microns.

* * * * *